United States Patent Office 2,765,255
Patented Oct. 2, 1956

2,765,255
INSECTICIDAL EMULSION CONCENTRATES

Thomas Swarbrick, Dundee, Scotland, assignor to Shell Development Company, Emeryville, Calif., a corporation of Delaware No Drawing. Application July 18, 1952,
Serial No. 299,725

Claims priority, application Netherlands October 25, 1948

6 Claims. (Cl. 167—43)

This invention relates to novel insecticidal concentrate compositions. More particularly, it relates to flowable paste concentrates which are easily diluted with water to form sprayable insecticide compositions containing the insecticide as suspended solid particles.

Insecticides are generally utilized in rather dilute compositions containing only a few percent of an active toxicant. The remainder of the composition is merely an inert carrier, or diluent, such as water, mineral spray oil, talc or other solid carriers, etc., which is necessary in order that the small quantities of toxicant required may be uniformly distributed over large areas. It is self-evident that if the compositions were formulated, shipped, stored, and sold in the diluted form suitable for ultimate application, storage and transportation problems and costs would be greatly magnified by the large quantities of inert material.

In order to minimize storage and transportation problems and costs, insecticides are generally commercially formulated, shipped, stored and sold in the form of concentrates, which are then diluted at or near the site of ultimate application. Concentrates are of many different types, and are formulated with a view to the diluent or carrier to be used, the facilities available for diluting and applying the compositions, and the general type of formulation (e. g., solution, emulsion, suspension, etc.) ultimately desired.

The present invention is directed to a type of concentrate which is to be diluted with water to form suspensions of a solid toxicant in water. At the present time, the only commercially available concentrates which can be diluted with water to form aqueous suspensions of the solid are the so-called "wettable powders" and "aqueous pastes."

Wettable powders generally consist of an insecticide absorbed upon, or otherwise carried by, a finely-divided inert solid carrier. A suspending and/or dispersing agent is also incorporated therein to promote wetting and dispersion of the solids when placed in water. The disadvantages of wettable powders are that the concentrate must contain a large proportion of inert diluent, and that the aqueous suspensions formed upon dilution with water are relatively unstable in that the solid particles settle rather rapidly upon standing.

Aqueous pastes generally consist of a finely-divided solid insecticide dispersed in an amount of water just sufficient to make a flowable paste composition. A suspending agent is also included to facilitate suspension of the solid particles in the water, both in the concentrate form and in the ultimately diluted form. The major disadvantage of the aqueous paste is that the concentrates tend to settle and pack on standing so that after a few months, or even weeks, of storage the concentrate is no longer flowable, and considerable difficulty is encountered in removing the insecticide from the container.

It has now been found that if a finely-divided solid insecticide is suspended in an intimately admixed heterogeneous liquid dispersion of water and water-insoluble organic liquid, with the organic liquid being the continuous phase of the heterogeneous liquid dispersion, a highly suitable concentrate can be formed. Such a concentrate remains stable and easily pourable even after long periods of storage, it is very readily diluted with water for ultimate application, and the diluted compositions are very stable in that the solid particles remain relatively uniformly dispersed within the aqueous phase.

As will be seen, the compositions of the present invention can be produced in a number of ways using different ingredients of the classes mentioned herein.

A typical illustrative composition of the present invention was prepared as follows:

Example I 50 parts by weight of dieldrin (6,7-epoxy-1,2,3,4,10,10-hexachloro - 1,4,4a,5,6,7,8,8a - octahydro - 1,4,5,8-dimethanonaphthalene), 23.6 parts by weight of a mineral oil (a spray oil having a boiling point curve on which the 10 and 80 percent points fall at 630° F. and 703° F., respectively with 13% recovered at 636° F., and having a viscosity of 101 S. S. U. at 100° F. and an unsulfonatable residue of 94%), 5.9 parts by weight of an aralkyl poly-ether alcohol emulsifier (sold by the Rohm and Haas Co. under the trade name of Triton X-100) and 0.6 part by weight of sodium petroleum sulfonates were mixed and passed three times through a three-roller paint mill. 19.9 parts by weight of water were then added to the paste, and milling was continued until the desired consistency was obtained. The consistency was measured with a standard lubricating grease penetrometer according to the procedure specified in ASTM D-217-48. The consistency was determined to be 215 deci-millimeters (tenths of a millimeter). The concentrate was stored under fluctuating temperature conditions (alternating 12 hour periods at 23° and 43° C.) and was still in excellent condition after 30 days. Upon dilution with water (100 parts of water to 1 part of concentrate) an aqueous suspension was easily formed in which there was practically no sediment, and no aggregation of solid particles as observed under a microscope.

Instead of the foregoing described order of mixing, the ingredients may be all mixed together before the milling operation, or the oil and insecticide may be mixed and milled wtih the subsequent addition of the emulsifier and water. The only critical feature in the milling operation is that the amounts of oil and water present during the milling must be such that the rolls of the mill are wetted by oil rather than water.

Instead of the three-roller paint mill used in the above-described preparation, any of the other commonly known grinding or milling apparatuses can be used, such as ball mills, tube mills, pebble mills, cage mills, attrition mills, compartment mills, colloid mills, etc.

Water-insoluble (water-immiscible) liquids which can be used in the present compositions include any of the mineral hydrocarbon oils of moderate viscosity such as spindle oils, mineral seal oils and similar light oil distillates. Relatively highly paraffinic mineral hydrocarbon oils having, for example, an unsulfonatable residue of about 80 or 85% or higher are particularly suitable. The stability of the concentrates is improved by using more viscous oils, such as those having viscosities as high as 250 (S. S. U. at 100° F.) or even higher. However, for very viscous oils (greater than about 1000 S. S. U. at 100° F.) the dispersibility of the concentrates in water becomes rather poor. Other suitable organic liquids are, for example, water-immiscible alcohols, ketones, ethers, esters of organic acids, and amines, which are neither too volatile nor too viscous, such as secondary alcohols prepared from 12 and 13 carbon atom alkene fractions, or the corresponding $C_{12}$—$C_{13}$ ketones, higher molecular weight amines, halogenated hydrocarbons such as chlorinated diphenyl and tetrachloroethane, liquid silicon compounds, and the like. The important aspect in the selection of a suitable water-insoluble organic liquid is that the organic liquid be one in which the insecticide to be formulated has, at most, only a very slight solubility. The liquids in which the maximum solubility of the insecticide is less than 5 or 10% by weight are much preferred.

The insecticides, or biocides, which may be formulated according to the present invention can be any which are ordinarily solid at room temperatures, and which are substantially insoluble in water. Examples of such insecticides are DDT, BHC or lindane, aldrin, dieldrin, toxaphene, sulfur, copper 8-hydroxy quinolate, carbophosphide, thiocarbophosphide, phosphorus triacetylenide, 2,3-dichloronaphthoquinone, the Diels-Alder reaction product of chloranil and cyclopentadiene, 2-heptadecyl - 4,4,6 - trimethyl-3,4,5,6-tetrahydropyrimidine and salts thereof, 2-heptadecylglyoxalidine and salts thereof, N-trichloromethyl-thiotetrahydrophthalimide, copper oxychloride, dinitro-ortho-cresol, tetramethyl thiuram disulfide, diphenyl sulfone, methoxychlor, $\beta$-chloroethyl $\beta$-(p - tert. - butylphenoxy) - $\alpha$ - methyl - ethyl sulfite, bis-(p-chloro-phenoxy) methane, 1,1-bis-(p-chlorophenyl) ethanol, etc.

The emulsifiers to be used will, of course, depend almost entirely upon the particular biocide being formulated and the oil used in the formulation. In general, non-ionic emulsifiers are preferred, although in many cases combinations of a non-ionic and an ionic (i. e., anionic or cationic), emulsifier are desirable. Of the non-ionic materials, the alkyl phenol ethers of polyethylene glycols (sold by Rohm and Haas under trade names such as Triton X–45, X–100 and X–155), and N-substituted long chain fatty acid amides are especially suitable. Of the ionic emulsifiers, the alkali and alkaline earth metal salts of naphtha or petroleum sulfonates, long chain alkyl substituted quaternary ammonium compounds, salts of secondary alkyl alcohol mono-esters of sulfuric acid, and the like, are quite effective. It will be readily recognized by those familiar with problems of emulsification that there are many other emulsifiers which may be utilized in place of the above-mentioned materials. The primary function of the emulsifiers is to promote oil-in-water emulsions when the present concentrates are diluted with water. Additional functions of the emulsifier are to stabilize the concentrate so that it will maintain an oil-continuous phase until dilution with water and to suspend and disperse the solid ingredients throughout the aqueous phase after dilution with water.

In general, the concentrates of the present invention will contain only the aforementioned ingredients, i. e., a water-isoluble organic liquid, one or more emulsifiers, one or more insecticides, and water. However, additional ingredients may be incorporated if desired, provided the amounts and properties thereof are not such as to interfere with the biocidal properties of the toxicant or the stability or dispersibility of the concentrate.

The relative amounts of the above-described components will vary quite markedly with different ingredients. It will be readily recognized that the fluidity of the concentrates will be decreased as the concentration of the solid toxicant is increased. Consequently, the upper limit of the concentration of the toxicant will be at least partially limited by the requirement that the concentrates have sufficient fluidity to be easily handled and readily dispersed in water. In general, the concentration of the toxicant can vary from about 20 or 30% by weight to as much as 55% or even 70% by weight. The fluidity of the concentrates may also be controlled somewhat by the ratio of water-insoluble organic liquid to water used. However, this ratio is somewhat limited by the requirement that the concentrates have an oil-continuous phase rather than a water-continuous phase. It will be readily apparent from this latter requirement that the concentration of water must be kept rather low, preferably less than 25% or even 20%, by weight of the concentrate. In general, the weight ratio of water-to-oil should be kept less than 2:1 or even 1.5:1. The concentration of the emulsifier will of course vary markedly with the particular emulsifier selected. In general between 1 or 2% and 10 or 15% will be required in order to promote satisfactory emulsification and dispersion of the concentrates in water.

In order that the compositions of the present invention be satisfactory with respect to stability, and dispersibility, there are three critical limitations. First, the consistency, or fluidity of the concentrate must be at least about 100 or 150 decimillimeters as determined by the aforementioned lubricating grease penetrometer. A penetration of from about 200 to 300 deci-millimeters is most desirable. At values greater than about 350 or 400 deci-millimeters the concentrate becomes too fluid to maintain a uniformly dispersed concentrate for long periods of time.

The second requirement is that the water-insoluble organic liquid should be the continuous phase in the concentrate. A relatively simple way to determine whether the composition has oil or water as the continuous phase is to centrifuge the compositions and note whether oil or water is the first liquid to separate from the composition. The continuous phase liquid will, of course, be the first to separate. In carrying out such a determination, care must be exercised not to centrifuge too severely, thereby separating both oil and water and leaving doubt as to which separated first. In order to avoid this difficulty it is recommended that centrifuging be initiated under relatively mild conditions, then gradually increasing the centrifugal force and/or the temperature until the separation of only one liquid is obtained.

The third requirement of the present concentrates is that the particles of the solid biocidal ingredient should be of very small (considerably less than 100 microns) in size. Preferably, at least about 90% of these solid particles should be below about 25 microns, with the average particle size between about 3 and about 15 microns. These solid particles must be well dispersed throughout the concentrate, otherwise they will tend to agglomerate and settle when diluted with the water for ultimate application.

The following are further illustrations of preparations of concentrates prepared according to the present invention:

Example II

A stable, flowable, easily water-dilutable insecticidal concentrate containing over 50% of DDT was prepared by grinding 60 parts of technical grade DDT (having a melting point range of from 90° to 100° C.) in the presence of 35.4 parts of spindle oil, 4 parts of an emulsifier sold under the trade name of Triton X–100 (non-ionogenic emulsifier consisting of arylalkyl poly-ether alcohols), and 0.6 part of oil-soluble mineral oil sulfonates. The DDT particles were reduced to sizes ranging from 10 to 30 microns and the resulting paste-like mixture was diluted, while stirring, with 14 parts of water. Even after 2 months, the resulting concentrate retained over 95% of the solid DDT in suspension, that small amount which had settled being easily re-suspended by stirring.

Example III

Sixty parts of technical benzene hexachloride were ground with 32 parts of spindle oil and 8 parts of Triton X–100 in a roller mill to form a paste which was then mixed with 12 parts of water while stirring.

The resultant stable and finely-dispersed concentrate, which was easily pourable, was diluted with water to give a suspension containing approximately 2.5% of the benzene hexachloride. When spraying this dilute suspension on cement or other porous material, practically no loss of the insecticide occurred through absorption by the porous surface layer and very satisfactory results were obtained in the control of flies.

Other compositions which have been prepared according to this invention are as follows:

Example IV

| | Percent |
|---|---|
| Sulphur | 45 |
| White oil | 23 |
| Triton X–100 | 4 |
| Water | 28 |

Example V

| | Percent |
|---|---|
| Carbophosphide | 20 |
| White oil | 30 |
| Triton X–100 | 5 |
| Triton X–45 | 5 |
| Water | 40 |

Example VI

| | Percent |
|---|---|
| Thiocarbophosphide | 30 |
| White oil | 35 |
| Triton X–100 | 10 |
| Water | 25 |

Example VII

| | Percent |
|---|---|
| Cupric salt of 8-hydroxyquinoline | 30 |
| White oil | 30 |
| Triton X–155 | 5 |
| Water | 35 |

Example VIII

| | Percent |
|---|---|
| Phosphorus triacetylenide | 32 |
| White oil | 20 |
| Triton X–100 | 5 |
| Triton X–45 | 5 |
| Water | 38 |

Example IX

| | Percent |
|---|---|
| 2,3-dichloronaphthoquinone-1,4 | 43 |
| White oil | 32 |
| Triton X–100 | 5 |
| Water | 20 |

Example X

| | Percent |
|---|---|
| Diels-Alder adduct of chloranil and cyclopentadiene | 50 |
| Lubricating oil | 20 |
| White spirit | 7 |
| Triton X–155 | 5 |
| Water | 18 |

Example XI

| | Percent |
|---|---|
| Diels-Alder adduct of chloranil and butadiene | 50 |
| Lubricating oil | 20 |
| White spirit | 7 |
| Triton X–155 | 5 |
| Water | 18 |

Example XII

| | Percent |
|---|---|
| DDT | 38.4 |
| Dieldrin | 11.6 |
| Mineral oil (same as in Example I) | 23.6 |
| Water | 19.9 |
| Triton X–100 | 5.9 |
| Sodium Petroleum sulfonates | 0.6 |

Example XIII

| | Percent |
|---|---|
| Diphenyl sulfone | 35 |
| White oil | 35 |
| Water | 25 |
| Triton X–100 | 5 |

Example XIV

| | Percent |
|---|---|
| 2-heptadecyl-4,4,6-trimethyl - 3,4,5,6 - tetrahydropyrimidine | 40.0 |
| Mineral oil (same as in Example I) | 20.7 |
| Water | 32.2 |
| Ethomid HT/20 (N-substituted long chain fatty acid amides, wherein substitutions are polyoxyethylene groups) | 5.0 |
| Arquad 2C (a dimethyl di-(long-chain-alkyl) ammonium chloride) | 0.5 |

The various oils used in the foregoing examples had the following characteristics:

*Spindle oil.*—Boiling range from 322° C. to 398° C., viscosity of 62 cp, at 20° C., unsulfonatable residue of 80% by weight.

*White oil.*—Boiling range from 305° C. to 377° C., viscosity of 51 cp. at 20° C., unsulfonatable residue of 91% by weight.

*Lubricating oil.*—Boiling range from 350° C. to 450° C., viscosity of 3000 cp. at 20° C., unsulfonatable residue of 60% by weight.

This application is a continuation-in-part of my copending application, Serial No. 121,905, filed October 17, 1949, now abandoned.

I claim as my invention:

1. A stable, flowable, water-dispersible, insecticidal concentrate composition having a consistency of from about 100 to about 400 deci-millimeters and comprising at least about 30% by weight of a finely-divided solid organic insecticide having an average particle size of from about 3 to about 15 microns, at least about 90% of said particles being less than about 25 microns, said particles being suspended uniformly throughout an intimately admixed liquid dispersion of water and mineral oil, the water in said concentrate comprising less than 25% by weight of the concentrate, the mineral oil in said liquid dispersion being the continuous phase, said insecticide being substantially insoluble in water and in said mineral oil, said concentrate also containing an emulsifier adapted to stabilize the concentrate and to promote dispersion of said concentrate in water to form an oil-in-water emulsion having the solid particles separately dispersed in the aqueous phase.

2. The composition of claim 1 wherein the solid organic insecticide is DDT.

3. The composition of claim 1 wherein the solid organic insecticide is dieldrin.

4. A stable, flowable, water-dispersible insecticidal concentrate composition having a consistency of at least about 100 deci-millimeters and comprising a solid insecticide finely divided into particles of less than 100 microns in size, said particles being suspended within an intimately admixed liquid dispersion of water and an essentially water-insoluble organic liquid, the water in said concentrate comprising less than about 25% by weight of the concentrate, the organic liquid in said liquid dispersion being the continuous phase, said insecticide being substantially insoluble in water and in said organic liquid, said concentrate also containing an emulsifier adapted to stabilize the concentrate and to promote dispersion of said concentrate in water to form an emulsion in which the aqueous phase containing separately dispersed solid particles is the continuous phase.

5. A stable, flowable, water-dispersible insecticidal concentrate composition having a consistency of at least about 100 deci-millimeters and comprising a solid insecticide finely divided into particles of less than 100 microns in size, said particles being suspended uniformly throughout an intimately admixed liquid dispersion of water and mineral oil, the mineral oil in said liquid dispersion being the continuous phase, said insecticide being substantially insoluble in water and in said mineral oil, the water in said concentrate comprising less than about 25% by weight of the concentrate, said concentrate also containing an emulsifier adapted to stabilize the concentrate and to promote dispersion of said concentrate in water to form an oil-in-water emulsion having solid particles separately dispersed in the aqueous phase.

6. A stable, flowable, water-dispersible, insecticidal concentrate composition having a consistency of at least about 100 deci-millimeters and comprising at least about 30% by weight of a solid insecticide finely divided into particles of less than 100 microns in size, said particles being suspended uniformly throughout an intimately admixed liquid dispersion of water and mineral oil, the water in said concentrate comprising less than 25% by weight of the concentrate, the mineral oil in said liquid dispersion being the continuous phase, said insecticide being substantially insoluble in water and in said mineral oil, said concentrate also containing an emulsifier adapted to stabilize the concentrate and to promote dispersion of said concentrate in water to form an oil-in-water emulsion having the solid particles separately dispersed in the aqueous phase.

References Cited in the file of this patent

UNITED STATES PATENTS

| | | |
|---|---|---|
| 1,429,430 | Holmes et al. | Sept. 19, 1922 |
| 2,330,227 | Lynn | Sept. 28, 1943 |
| 2,369,429 | Boissonou | Feb. 13, 1945 |
| 2,521,318 | Wohlers et al. | Sept. 5, 1950 |

FOREIGN PATENTS

| | | |
|---|---|---|
| 577,480 | Great Britain | May 20, 1946 |
| 609,762 | Great Britain | Oct. 6, 1948 |

OTHER REFERENCES

Smith et al.: Industrial and Engineering Chemistry, April 1942, pages 490 to 493.

Jones: Journal Economic Entomology, December 1946, volume 39, pages 735 to 740.

De Ong: Chemistry and Uses of Insecticides, Rheinhold Publishing Corporation, New York City, 1948, pages 134, 135. (Copy in POSL and Division 43.)

Jones et al.: Committee on Medical Research of the Office of Scientific Research and Development, U. S. Bureau of Entomology and Plant Quarantine, OSRD Insect Control Committee Report Number 30, "Interim Report Number O-96, June 12, 1945, "Solvents for DDT" (pages 1 to 4).